United States Patent
Kuroda

(10) Patent No.: US 7,505,858 B2
(45) Date of Patent: Mar. 17, 2009

(54) METHOD FOR ANALYZING TONE QUALITY OF EXHAUST SOUND

(75) Inventor: Osamu Kuroda, Toyota (JP)

(73) Assignee: Sango Co., Ltd., Aichi (JP)

( * ) Notice: Subject to any disclaimer, the term of this patent is extended or adjusted under 35 U.S.C. 154(b) by 78 days.

(21) Appl. No.: 11/658,536

(22) PCT Filed: Jun. 28, 2005

(86) PCT No.: PCT/JP2005/011785

§ 371 (c)(1),
(2), (4) Date: Jan. 25, 2007

(87) PCT Pub. No.: WO2006/011329

PCT Pub. Date: Feb. 2, 2006

(65) Prior Publication Data

US 2008/0125992 A1   May 29, 2008

(30) Foreign Application Priority Data

Jul. 26, 2004 (JP) ............................. 2004-217252

(51) Int. Cl.
*G01R 23/16* (2006.01)
(52) U.S. Cl. ...................................... 702/76
(58) Field of Classification Search .............. 702/75, 702/76, 77
See application file for complete search history.

(56) References Cited

U.S. PATENT DOCUMENTS 4,538,295 A * 8/1985 Noso et al. ................. 704/248
5,532,936 A * 7/1996 Perry ........................... 702/76
7,155,333 B1 * 12/2006 Abram et al. ............... 701/111

FOREIGN PATENT DOCUMENTS

| JP | A 6-117912   | 4/1994 |
| JP | A 6-186077   | 7/1994 |
| JP | A 7-306087   | 11/1995 |
| JP | A 2002-112505 | 4/2002 |
| JP | A 2003-65836 | 3/2003 |

OTHER PUBLICATIONS

Toshihiro Wakita, RVISS real-time visualization software for vehicle sound color, R& D review of Toyota CRDL vol. 35, No. 3 (Sep. 2000).*
Merriam webster online dictionary, Fromant definition, http://www.merriam-webster.com/dictionary/FORMANT.*
Keen, R.G., "Human Voices and the Wah Pedal," URL:http://www.geofex.com/Article_Folders/wahped/voicewah.htm>, (1999).
Koizumi, K. "Tan'i no Jiten," Special 4th Revised Edition, p. 202, Decibel (Mar. 19, 1986).

* cited by examiner

*Primary Examiner*—Bryan Bui
*Assistant Examiner*—Aditya Bhat
(74) *Attorney, Agent, or Firm*—Oliff & Berridge, PLC

(57) ABSTRACT

According to evaluation of tone quality of exhaust sound adapted to human audition, a characteristic of the tone quality of exhaust sound is objectively analyzed. There are provided a measuring process (M1) for sampling exhaust sound to be analyzed, by means of a microphone disposed in an exhaust system EX and converting the exhaust sound into an electric signal, an analyzing process (M2) for amplifying a high frequency component of the electric signal and performing a frequency analysis of the electric signal at an arbitrary time interval, a detecting process (M3) for detecting a first formant of the first peak from the low frequency side and a second formant of the second peak from the low frequency side, and a displaying process (M4) for displaying a relationship (brightness and sharpness) between the first formant and second formant in a predetermined time range.

2 Claims, 7 Drawing Sheets

METHOD FOR ANALYZING TONE QUALITY OF EXHAUST SOUND

FIELD OF THE INVENTION

The present invention relates to a method for analyzing tone quality, and particularly relates to the method for analyzing the tone quality of exhaust sound emitted from an exhaust system of a vehicle.

BACKGROUND ART

As a representative of sound emitted from a vehicle, there is exhaust sound emitted from an exhaust system of a vehicle. As for the exhaust sound, such results as being indicated by sound quantity (sound pressure) and its frequency distribution as its physical quantity are evaluated, and an effective counter measure has been provided for a muffler or the like disposed in the exhaust system, in order to reduce it to be equal to or smaller than a reference value of the sound quantity determined according to laws or the like. On the other hand, tone quality (timbre) of the exhaust sound may affect the impression of the vehicle, so that it can be said that the tone quality of the exhaust sound is one of factors affecting marketability of the vehicle.

With respect to the tone quality of the exhaust sound, such a subjective ranging method had been employed in the past, as expressing impression to a subject in audition thereof with words like "brightness" and "sharpness", or scoring it. For example, in Non-Patent document 1, there are disclosed relationships between first and second formants and vowel sound, and it is indicated that the formants are strongly correlated with the vocal vowel sound. However, as it was difficult to indicate the tone quality as the physical quantity, the subjective ranging method was lack of objectiveness and quantitative, and furthermore it was difficult to evaluate appropriately the tone quality of the exhaust sound varied according to driving conditions.

Even in that situation, a try for objectively evaluating the tone quality (timbre) of the exhaust sound was made, and various methods have been proposed from the past. For example, in Patent documents 1 and 2, there are disclosed methods for estimating and evaluating the tone quality from the sound level at every frequencies, and in Patent document 3, there is disclosed a methods for estimating and evaluating the timbre from fluctuation of the sound level at every frequencies.

Patent Document 1:
Japanese Patent Laid-open Publication No. 6-186077
Patent Document 2:
Japanese Patent Laid-open Publication No. 7-306087
Patent Document 3:
Japanese Patent Laid-open Publication No. 6-117912
Non-Patent document 1: Human Voices and the Wah Pedal, Copyright 1999 R. G. Keen [online]. [retrieved on 2005-06-14]. Retrieved from the Internet:
<URL:http://www.geofex.com/Article_Folders/wahpedl/voicewah.htm>

DISCLOSURE OF THE INVENTION

Problems to be Solved by the Invention

In the mean time, it is known that there exist peaks (formants) of natural frequencies in a human voice or a musical instrument, and that they are factors for characterizing the voice or sound. Thus, there is such a possibility that difference in tone quality (timbre) of the exhaust sound has been caused by the factors which are not dependent on the frequency or sound level, so that it could not be concluded that only the prior method was enough to evaluate the tone quality of the exhaust sound.

Accordingly, in the method for analyzing the tone quality of exhaust sound emitted from the exhaust system of the vehicle, a problem to be solved in the present invention is to provide the method for objectively analyzing a characteristic of the tone quality of exhaust sound, by means of evaluation of the tone quality of exhaust sound adapted to human audition.

Means for Solving the Problems

To solve the above-described problem, a method for analyzing tone quality of exhaust sound according to the present invention comprises sampling exhaust sound to be analyzed and converting the exhaust sound into an electric signal, amplifying a high frequency component of the electric signal and performing a frequency analysis of the electric signal at an arbitrary time interval, detecting a first formant of the first peak from the low frequency side and a second formant of the second peak from the low frequency side, and displaying a relationship between the first formant and second formant detected at the arbitrary time interval, in a predetermined time range.

Also, the method for analyzing tone quality of exhaust sound according to the present invention may comprise a process for sampling exhaust sound to be analyzed and converting the exhaust sound into an electric signal, a process for amplifying a high frequency component of the electric signal and performing a frequency analysis of the electric signal at an arbitrary time interval, a process for detecting a first formant of the first peak from the low frequency side and a second formant of the second peak from the low frequency side, a process for operating brightness and sharpness on the basis of the first formant and second formant detected at the arbitrary time interval, and a process for displaying time variations of the brightness and sharpness.

It may so constituted that if the first formant and second formant are indicated by F1 and F2, respectively, and if the brightness and sharpness are indicated by X and Y, respectively, provided are X=20 log(F1/A) and Y=20 log(F2/B), where A and B are constants.

Effects of the Invention

As the present invention is constituted as described above, the following effects can be achieved. That is, according to the method for analyzing tone quality of exhaust sound in the present invention, with the first formant and second formant being detected, to analyze the tone quality of exhaust sound, evaluation of the tone quality of exhaust sound adapted to human audition can be made, so that the characteristic of the tone quality of exhaust sound can be analyzed according to an objective common scale.

DESCRIPTION OF CHARACTERS

| | |
|---|---|
| EX | exhaust system |
| M1 | measuring process |
| M2 | analyzing process |
| M3 | detecting process |
| M4 | displaying process |
| M41 | operating process |
| M42 | displaying process |

Best Mode for Carrying Out the Invention

Hereinafter, will be explained a desirable embodiment of the present invention, referring to drawings.

Figure 1:
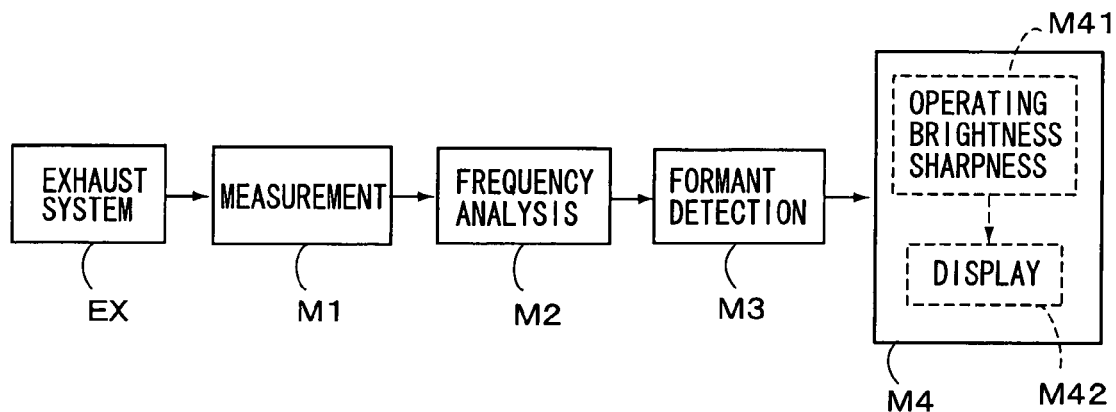
FIG. 1 is a block diagram showing main components of a method for analyzing tone quality of exhaust sound according to an embodiment of the present invention.

FIG. 1 shows main components of a method for analyzing tone quality of exhaust sound according to an embodiment of the present invention, wherein there are provided a measuring process (M1) for sampling exhaust sound to be analyzed, by means of a microphone (not shown) disposed in an exhaust system EX and converting the exhaust sound into an electric signal, an analyzing process (M2) for amplifying a high frequency component of the electric signal and performing a frequency analysis of the electric signal at an arbitrary time interval, a detecting process (M3) for detecting a first formant of the first peak from the low frequency side and a second formant of the second peak from the low frequency side, and a displaying process (M4) for displaying a relationship between the first formant and second formant detected at the arbitrary time interval, in a predetermined time range.

The above-described displaying process (M4) comprises an operating process (M41) for operating brightness and sharpness on the basis of the first formant and second formant, and a displaying process (M42) for displaying time variations of the brightness and sharpness, as indicated by broken lines in FIG. 1. And, in the operating process (M41), the first formant and second formant are indicated by F1 and F2, respectively, and the brightness and sharpness are indicated by X and Y, respectively, so that the brightness and sharpness are operated on the basis of $X=20\log(F1/A)$ and $Y=20\log(F2/B)$, where A and B are constants, respectively.

Figure 2:
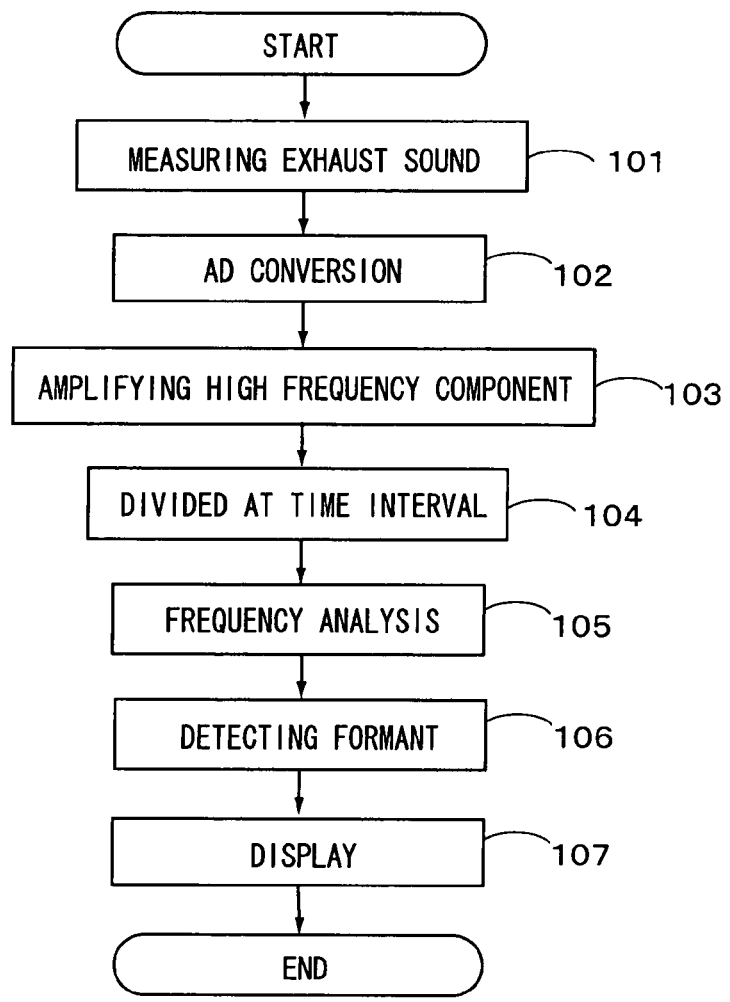
FIG. 2 is a flowchart showing a method for analyzing tone quality of exhaust sound according to an embodiment of the present invention.

Next, the method for analyzing the tone quality of exhaust sound as constituted above will be explained, referring to a flow chart as shown in FIG. 2. At the outset, exhaust sound is sampled by the microphone (not shown) disposed in the exhaust system EX, and converted into an electric signal, at Step 101. Next, after it was converted by an AD converter (not shown) into a digital signal at Step 102, its high frequency component is amplified by a differentiating circuit (not shown) at a rate of 6 dB per one octave, for example, at Step 103. The digital signal obtained at this Step is divided into those of 20-50 msec at Step 104, and the program proceed to Step 105, where frequency analysis of them is performed at the divided time interval, to obtain a frequency transition and relative amplitude transition.

Figure 11:
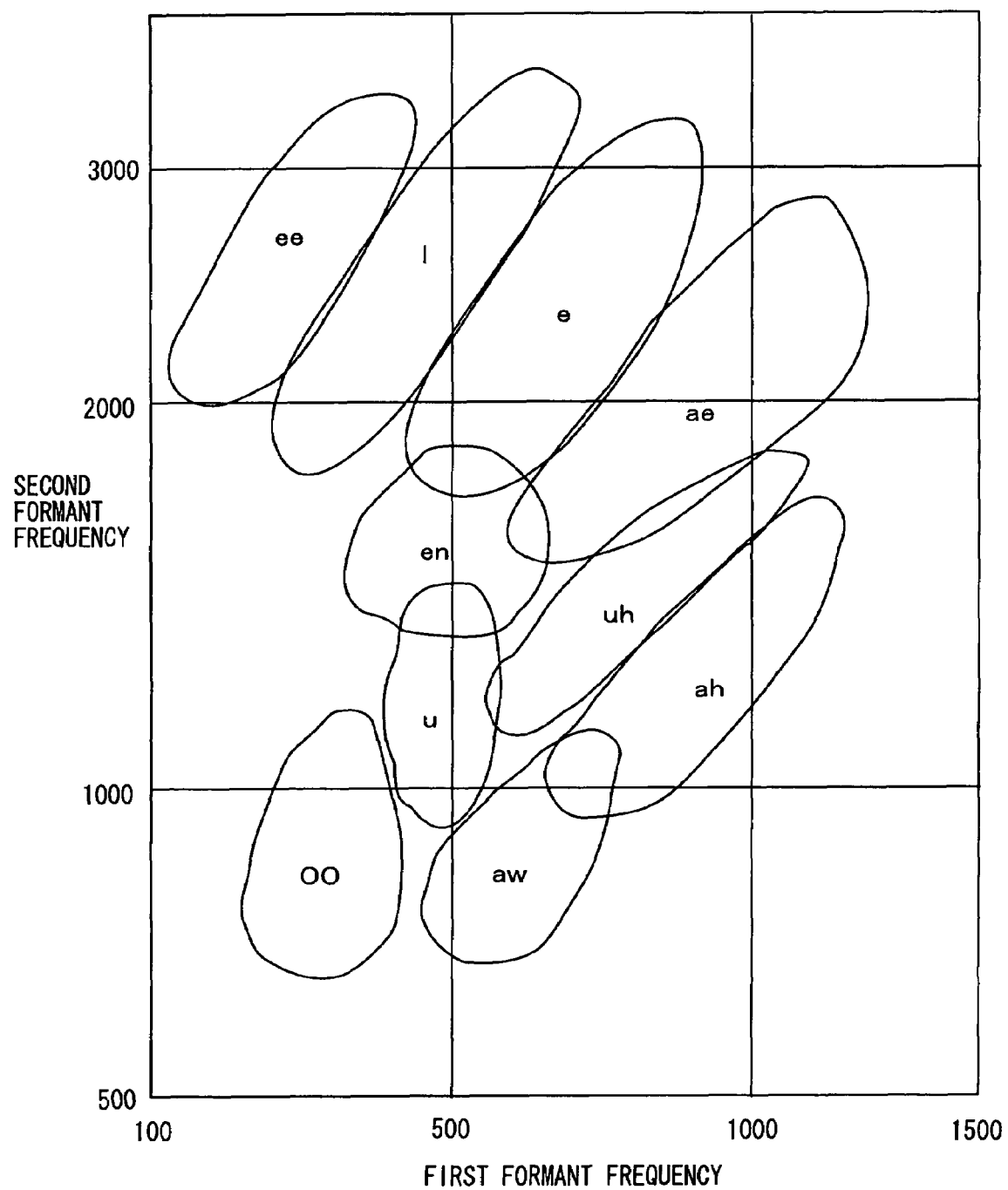
FIG. 11 is a graph showing relationships between first formant, second formant and vowel sounds.

Then, the program proceed to Step 106, where a frequency indicative of the first peak from the low frequency side (F1; first formant), and a frequency indicative of the second peak from the low frequency side (F2; second formant) are detected. The relationship between the first formant and second formant as detected above is displayed on a displaying part at the divided time interval, throughout a predetermined time range, at Step 107. In practice, on a quadrant with the frequency of the first formant and the frequency of the second formant provided for orthogonal axes, each point indicative of each formant frequency is plotted at the divided time interval, as described later in detail. As a result, variance and transition of groups of the plotted points will show a feature of the timbre itself and its time transition. Also, since the formant is strongly correlated with the vowel of vocal sound, as shown in FIG. 11, if a group of the plotted points is concentrated on a certain vowel range, the timbre will become close to the audition of that vowel sound, in terms of both of its brightness and sharpness. Therefore, auditory estimation of the timbre of exhaust sound can be achieved, through its correlation with each vowel range.

Figure 3:
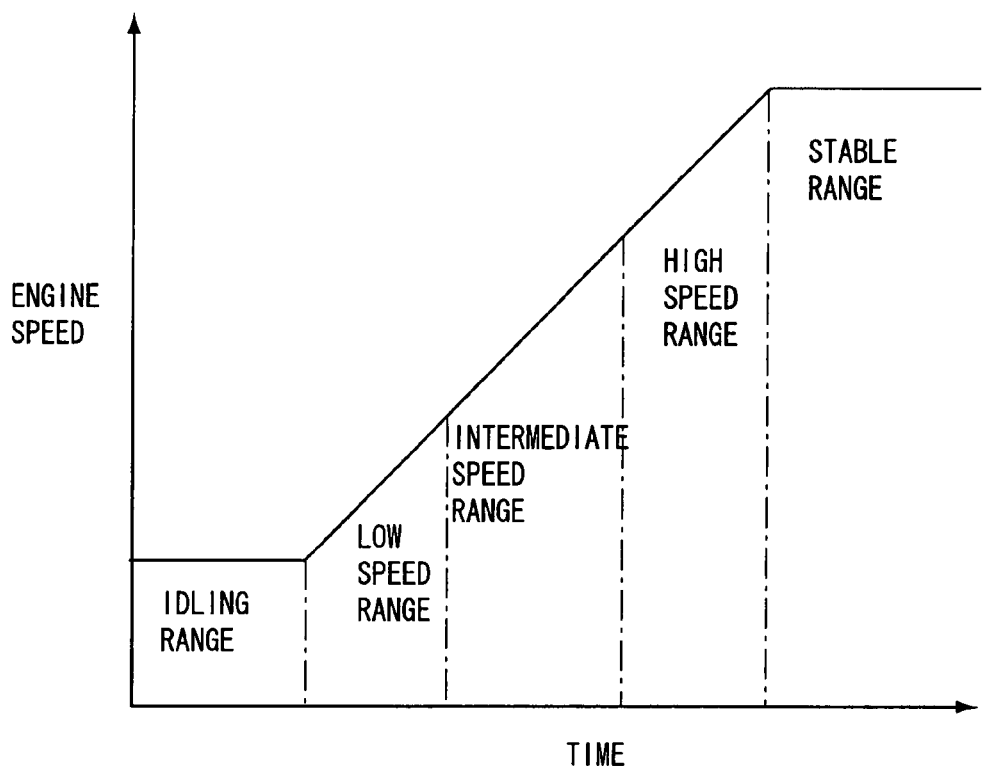
FIG. 3 is a graph showing an example of conditions for controlling an engine, when an analysis is performed by a method for analyzing tone quality of exhaust sound according to an embodiment of the present invention.
Figure 4:
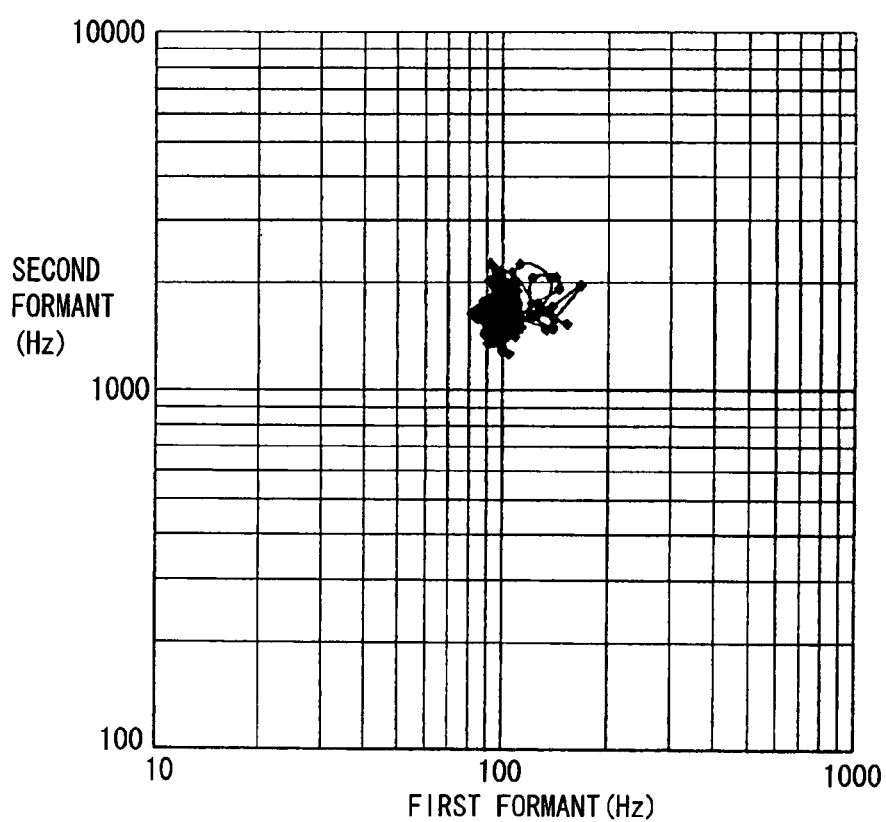
FIG. 4 is a graph showing an example of a result of having analyzed tone quality in an idling range by a method for analyzing the tone quality of exhaust sound according to an embodiment of the present invention.
Figure 5:
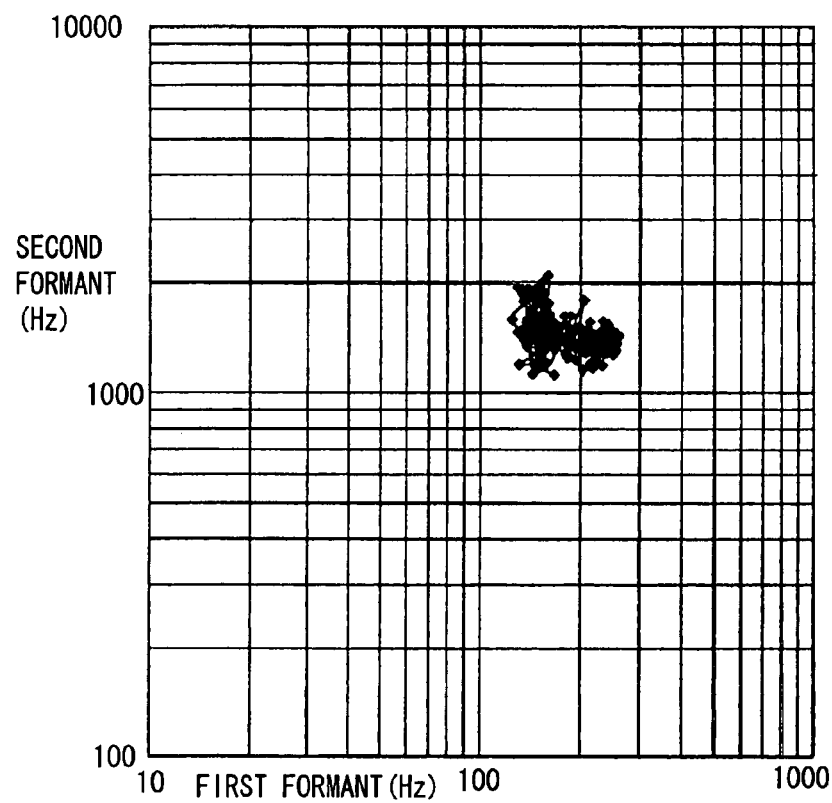
FIG. 5 is a graph showing an example of a result of having analyzed tone quality in a low speed range by a method for analyzing the tone quality of exhaust sound according to an embodiment of the present invention.
Figure 6:
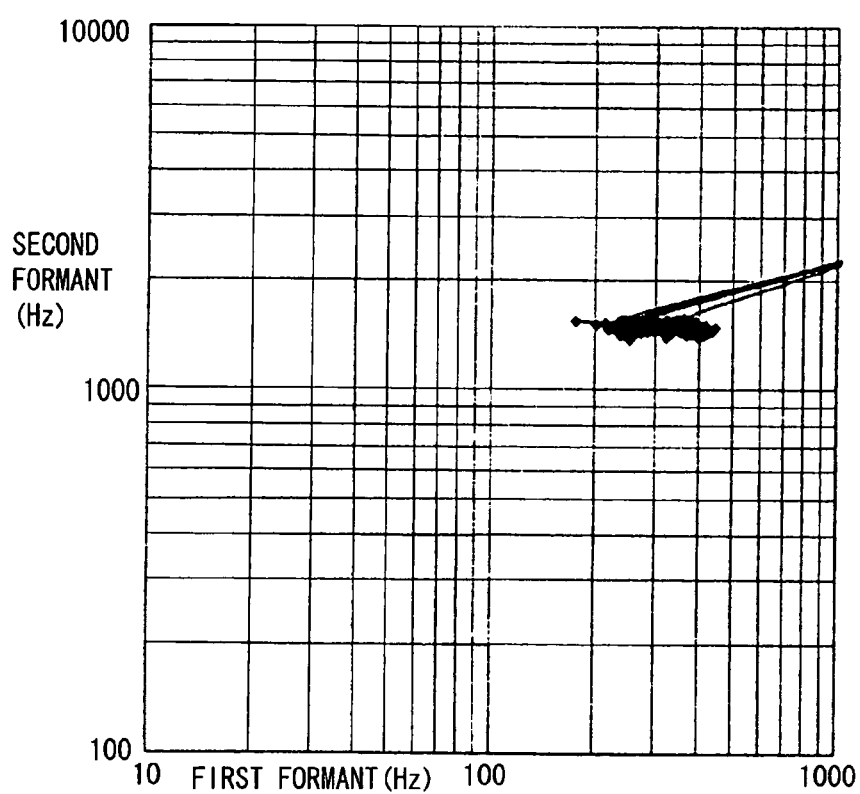
FIG. 6 is a graph showing an example of a result of having analyzed tone quality in an intermediate speed range by a method for analyzing the tone quality of exhaust sound according to an embodiment of the present invention.
Figure 7:
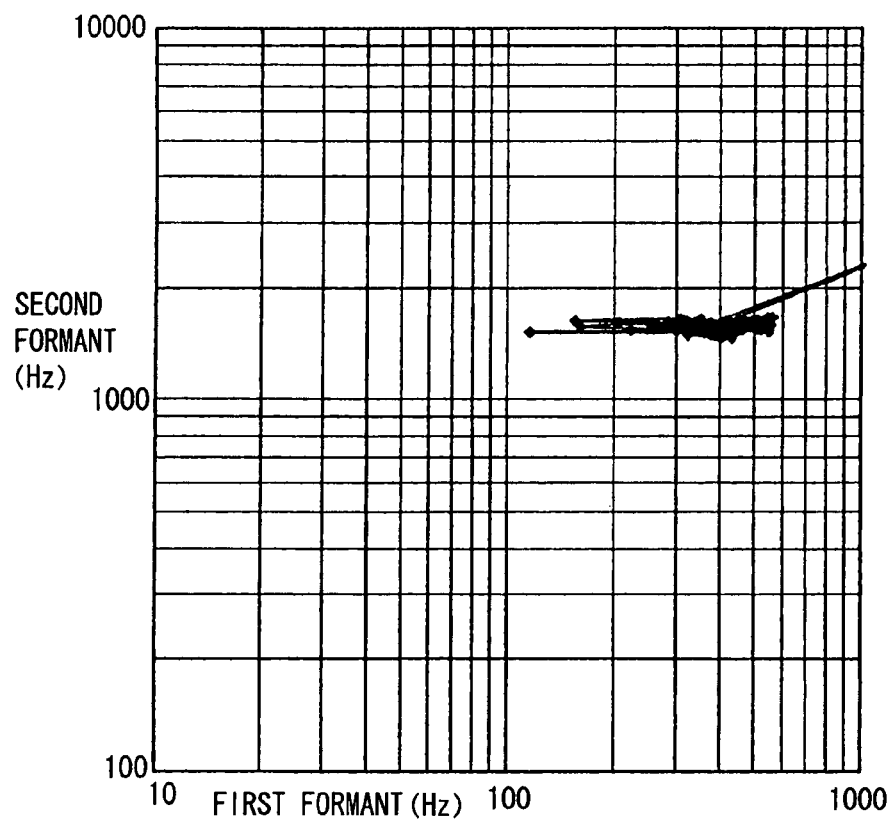
FIG. 7 is a graph showing an example of a result of having analyzed tone quality in a high speed range by a method for analyzing the tone quality of exhaust sound according to an embodiment of the present invention.
Figure 8:
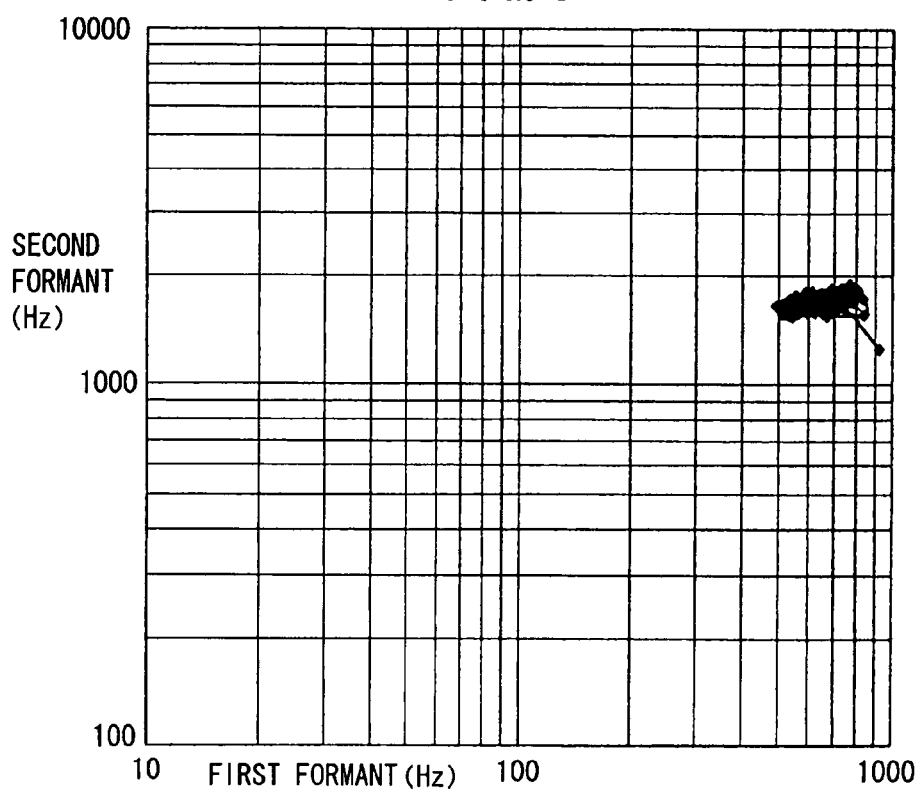
FIG. 8 is a graph showing an example of a result of having analyzed tone quality in a stable range by a method for analyzing the tone quality of exhaust sound according to an embodiment of the present invention.

Next will be explained the result analyzed by the above-described method for analyzing the tone quality, about the exhaust sound emitted from the exhaust system EX of the vehicle. Having sampled the exhaust sound, when the engine was controlled according to the conditions as shown in FIG. 3, FIG. 4 shows the result of having analyzed the tone quality in its idling range, FIG. 5 shows the result of having analyzed the tone quality in its low speed range, FIG. 6 shows the result of having analyzed the tone quality in its intermediate speed range, FIG. 7 shows the result of having analyzed the tone quality in its high speed range, and FIG. 8 shows the result of having analyzed the tone quality in its stable range. As the results of various analyses of the tone quality of exhaust sound, the present inventors have found that the first formant relates to the "brightness" of the exhaust sound, and that the second formant relates to the "sharpness" of the exhaust sound. For example, it can be seen from the examples in FIGS. 4-8 that the sharpness of the exhaust sound is not varied so much, but the exhaust sound is getting brighter and brighter, with the engine speed being increased.

Figure 9:
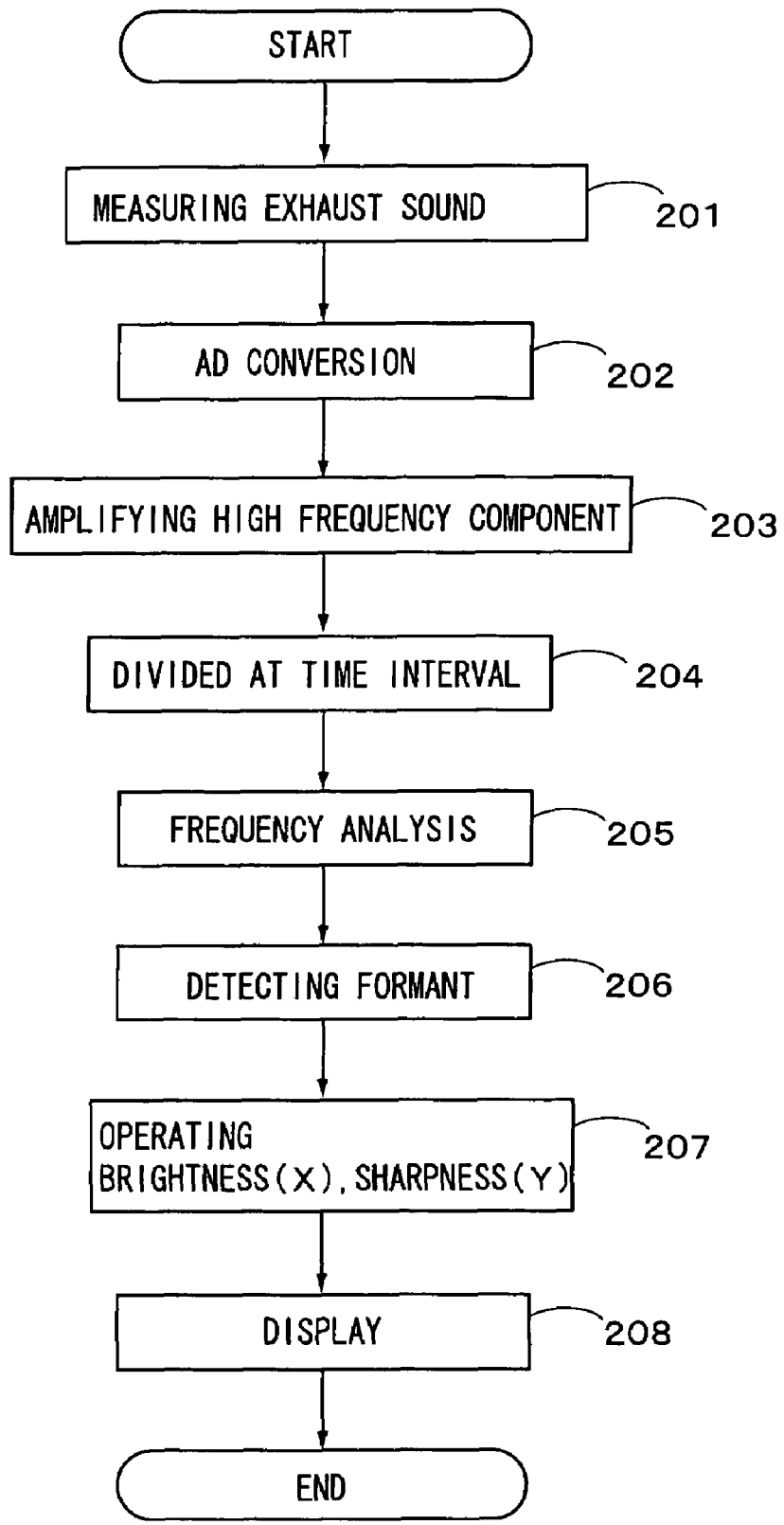
FIG. 9 a flowchart showing a method for analyzing tone quality of exhaust sound according to another embodiment of the present invention.

FIG. 9 shows a flow chart of the method for analyzing tone quality of exhaust sound according to another embodiment of the present invention, wherein Steps 201-204 are the same as Steps 101-104 in FIG. 2, so that the explanation of them is omitted. At Step 205, having performed frequency analysis at each time interval, the frequency and relative amplitude are obtained. Then, the program proceed to Step 206, where the frequency indicative of the first peak from the low frequency side (F1; first formant), and the frequency indicative of the second peak from the low frequency side (F2; second formant) are detected.

Further, the program proceed to Step 207, where the brightness (X) and sharpness (Y) are operated at a computing element on the basis of X=20 log(F1/A) and Y=20 log(F2/B), where A and B are constants, respectively.

Figure 10:
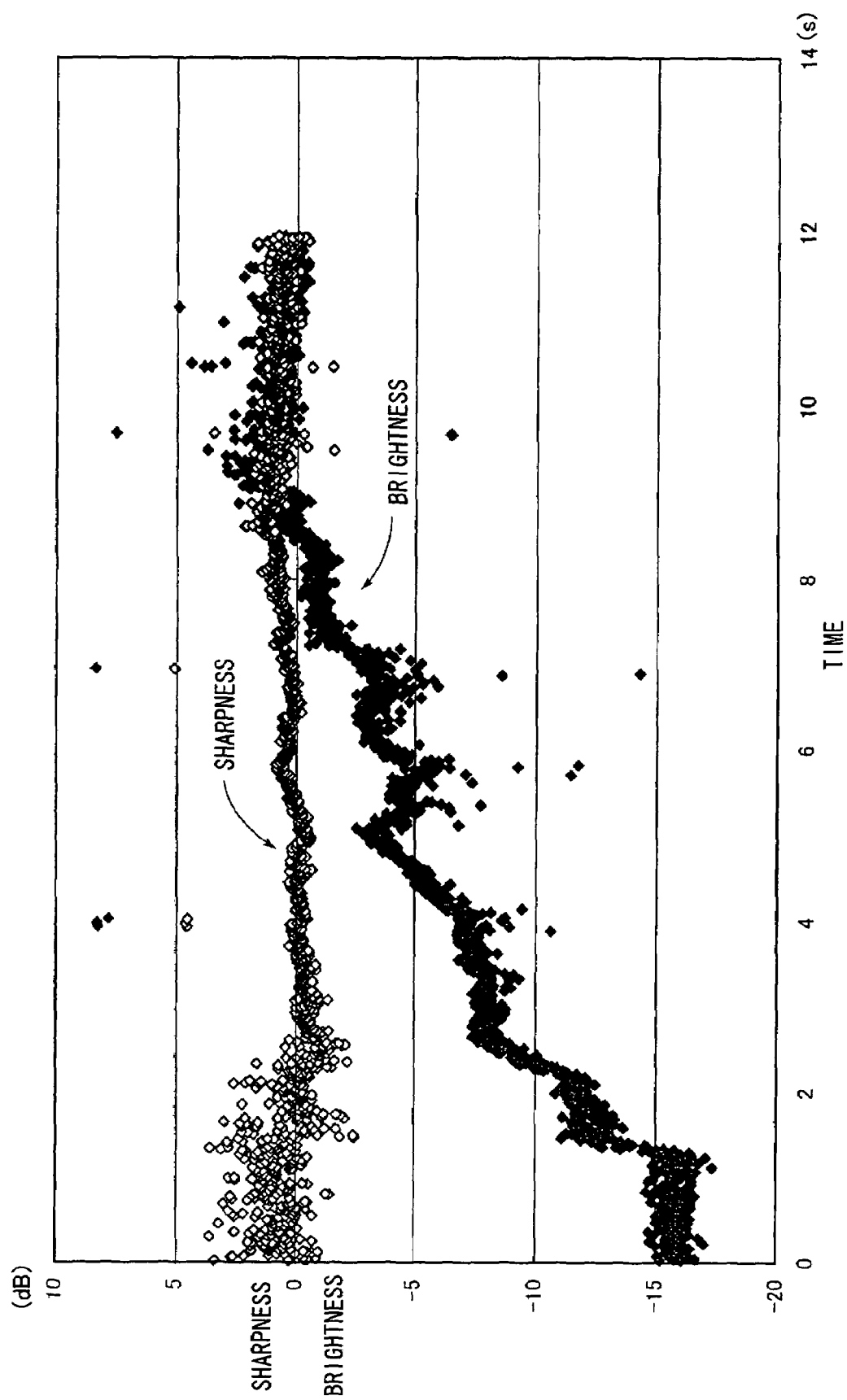
FIG. 10 is a graph showing an example of a result of having analyzed tone quality by a method for analyzing the tone quality of exhaust sound according to another embodiment of the present invention.

And, at Step 208, the time variations of the brightness (X) and sharpness (Y) are displayed on a displaying element. FIG. 10 shows the results of operations made at Step 207 according to A=600 Hz, B=1500 Hz, on the basis of the measured results of the exhaust sound as shown in FIGS. 4-8. By indicating them as shown in FIG. 10, the time variations of the brightness and sharpness can be shown more clearly.

In the above-described embodiment, the comparison was made in the consecutively varied driving conditions, while it is not limited to the above, but its application is arbitrary, such that it can be applied to the comparison among transitions in all of the driving conditions, to be used for a tone tuning of the exhaust system. Although the scale by the first formant indicates the brightness, and the scale by the second formant indicates the sharpness, so that they well correspond to the subjective ranging scales for the actual exhaust sound, the scales are not limited to them, and the most appropriate subjective ranging scale may be employed. Furthermore, the displayed data may be fed back to a known variable muffler device, so that the timbre can be automatically modified at real time. For example, in the case where "I" vowel sound (second formant of 2000-3000 Hz) in FIG. 11 is a dominant timbre in the present exhaust sound, and it is desired to be changed into the timbre in the range of "u" or "oo", the sound around 800 Hz level, which can be realized as the second formant, may be forcedly added by a sound generating device such as a speaker, so that the exhaust sound with the vowel sound of "u" or "oo" being dominant in its timbre can be obtained. Thus, with the vowel of the exhaust sound being controlled, a real time tuning can be achieved on the vehicle to provide a desired timbre of the exhaust sound.

The invention claimed is:

1. A method for analyzing tone quality of exhaust sound comprising:

sampling the exhaust sound to be analyzed and converting the exhaust sound into an electric signal, amplifying a high frequency component of the electric signal and performing a frequency analysis of the electric signal at an arbitrary time interval, detecting from a low frequency side of the high frequency component, a frequency indicative of a first formant, and detecting from the low frequency side, a frequency indicative of a second formant, and displaying brightness and sharpness of the exhaust sound on the basis of the first formant and second formant detected at the arbitrary time interval, in a predetermined time range, wherein the brightness and the sharpness of the exhaust sound are indicated by X and Y, respectively, where X=20 log(F1/A) and Y=20 log(F2/B), A and B are constants, and the first formant and the second formant are indicated by F1 and F2, respectively.

2. A method for analyzing tone quality of exhaust sound comprising:

a process for sampling the exhaust sound to be analyzed and converting the exhaust sound into an electric signal, a process for amplifying a high frequency component of the electric signal and performing a frequency analysis of the electric signal at an arbitrary time interval, a process for detecting from a low frequency side of the high frequency component, a frequency indicative of a first formant, and detecting from the low frequency side, a frequency indicative of a second formant, a process for calculating brightness and sharpness of the exhaust sound on the basis of the first formant and second formant detected at the arbitrary time interval, and a process for displaying time variations of the brightness and sharpness, wherein the brightness and sharpness are indicated by X and Y, respectively, where X=20 log(F1/A) and Y=20 log(F2/B), A and B are constants, and the first formant and the second formant are indicated by F1 and F2, respectively.

* * * * *